March 23, 1954

W. F. HERLIHY 2,672,632

METHOD OF MAKING MOLDED AND STIFFENED
SHOE QUARTER ASSEMBLY

Filed Oct. 19, 1951

Inventor
William F. Herlihy
by Roberts Cushman & Grover
Att'ys

March 23, 1954  W. F. HERLIHY  2,672,632
METHOD OF MAKING MOLDED AND STIFFENED
SHOE QUARTER ASSEMBLY
Filed Oct. 19, 1951  2 Sheets-Sheet 2

Inventor
William F. Herlihy
by Roberts Cushman & Grover
Attys

Patented Mar. 23, 1954

2,672,632

UNITED STATES PATENT OFFICE 2,672,632

METHOD OF MAKING MOLDED AND STIFFENED SHOE QUARTER ASSEMBLY

William F. Herlihy, Haverhill, Mass., assignor to Lowell Counter Company, Lowell, Mass., a copartnership Application October 19, 1951, Serial No. 252,081

1 Claim. (Cl. 12—146)

This invention pertains to footwear and more especially to a new and improved method of making a pre-shaped stiffened end portion, for instance the quarter portion of a shoe, and to a stage product useful in the practice of said method.

With particular reference to the quarter portion of a shoe, for example, customary practice, in making such a quarter portion, is to stitch together those parts of the outer ply of the upper material which are to be included in the quarter (together with liner parts, if used) and then to assemble a stiffener or counter with these parts of the upper, the quarter, with its stiffener, then being shaped during heel lasting. If a premoulded counter be employed, the lasting operation must conform this stiff counter, as well as the upper, material to the end contour of the last and if the upper material be heavy or inflexible this is a very difficult task to accomplish. It has been proposed to subject the quarter and stiffener to a die moulding operation preparatory to lasting, thereby to impart to the quarter a shape at least approximating that of the heel end of the last and thus to facilitate the actual lasting operation, or in the case of a slip-lasted or California type shoe to give the quarter its final shape.

Die moulding has many advantages, particularly in the manufacture of slip-lasted shoes in which a stiffener is employed but in order that the shoes may have the desired final shape care must be exercised in the assembly of the stiffener with the upper material and in keeping the parts properly positioned in introducing the material between the dies. Moreover, the rear end of the quarter is internally concave and when a conventional counter (counters usually being made in only a few sizes) is placed within the cavity of the upper material and is subjected to pressure, there is a tendency (unless the dies happen to be of the exact size of the counter) to wrinkle or pleat the material, resulting in a shoe which is uncomfortable to the wearer.

It has heretofore been proposed adhesively to unite outer material, stiffener material and liner material to form a laminar sheet and then to cut from this sheet the quarter blank which is thereafter die moulded. But this procedure is limited, so far as I am aware, to the manufacture of open shank shoes and is not practically applicable to the manufacture of such shoes in which the quarter and vamp are directly connected to each other prior to the introduction of a last.

The present invention contemplates the provision of a counter liner and stiffener, as a unit, useful in the manufacture of shoes according to any conventional practice, but which is particularly useful in making shoes according to systems wherein the quarter of the shoe is shaped by die moulding either prior to or as a substitute for lasting. The practice of the present invention insures the accurate placing of the stiffener with reference to the outer ply of the quarter; it insures a quarter liner and stiffener devoid of wrinkles; makes it possible to prepare the outer ply of the quarter in accordance with customary procedures and using any desired material without reference to the kind or color of the quarter lining; and the attachment of the quarter lining to the outer ply in accordance with usual conventional practice, and the union of the quarter to the vamp portion of the upper in conventional manner. Other and further objects and advantages of the invention will be pointed out in the following more detailed description and by reference to the accompanying drawings wherein:

Figure 1:
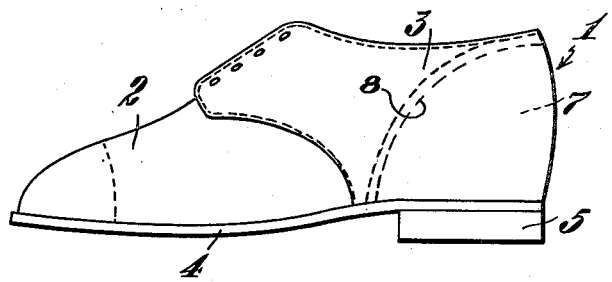
Fig. 1 is a side elevation of a shoe of a conventional type.

Referring to the drawings, the numeral 1 indicates a shoe as illustrative of an article of footwear to which the present invention may apply. The illustration of the shoe is more or less diagrammatic and without attempting to show the details of the bottom construction, it being understood that the invention is applicable to the manufacture of shoes of conventional types, including California or slip-lasted shoes. The shoe as illustrated has the vamp portion 2, the quarter portion 3, the outer sole 4 and the heel 5. As illustrated herein, the quarter portion, aside from the combined lining and stiffener element of the present invention, consists of a single ply of material, for example leather, this outer ply being finished at its upper edge as shown at 6. The composite counter or quarter liner 7 of the present invention is permanently secured to the outer ply 3 of the quarter by sewed seams 8 extending around the lateral and upper margins of the combined quarter liner and stiffener.

Figure 4:
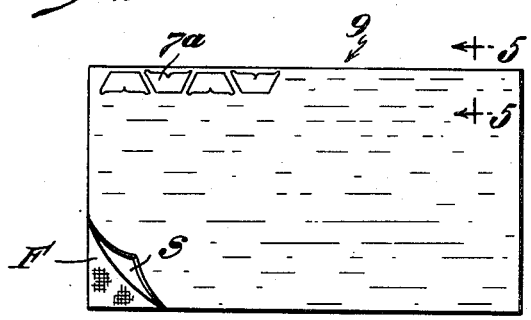
Fig. 4 is a plan view to small scale of a sheet of laminate material useful in the practice of the invention.
Figure 5:
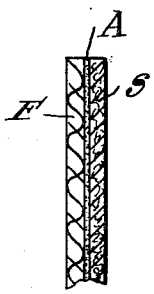
Fig. 5 is a fragmentary section, to larger scale, on the line 5—5 of Fig. 4.
Figure 7:
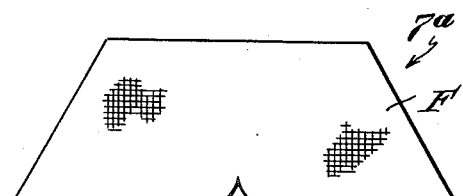
Fig. 7 is a view similar to Fig. 6, but showing the opposite side of the blank.

In accordance with the present invention the composite counter or quarter lining and stiffener is made by first providing or preparing a laminate sheet 9 (Fig. 4) of any desired extent comprising a ply F (Fig. 5) of flexible lining material, which may be a textile fabric, thin leather, or the like, and a ply S of stiffening material which, as here illustrated (Fig. 5) is united to the ply F by an interposed layer or coating A of adhesive. The stiffener ply S may be of any of the usual materials employed for stiffening the end portions of a shoe upper, but should be of a type which is inherently capable of becoming plastic or mouldable when subjected to proper treatment. Thus it may be a thermoplastic material or a material which becomes soft and mouldable when treated with a volatile solvent, such materials being commonly employed in making shoe counters or stiffeners. Such a thermo-plastic material commonly employed in shoe part stiffeners is a compound of montan wax and hard asphalt as disclosed, for instance, in the patent to Beckwith, 1,124,835. A solvent-softened material commonly used as a shoe stiffener is Celluloid which may be softened by dipping in acetone. Shoe counters of this material are commonly sold as Celastic counters. If desired the laminate sheet 9 may be made by coating the fabric ply F with a spreadable stiffener substance (for example in a pasty state, either from heating or the employment of a volatile solvent) which, without interposed adhesive, will firmly adhere to the liner ply F. One spreadable stiffener substance is dextrose glue—see the patent to Mahler, 1,640,362—this material being softened by water treatment. Another stiffener material used in box toes and the like is gum shellac which may be softened by alcohol, and another is asphalt which may be softened by heat. Usually if the ply S is thermoplastic, it will consist of fibrous material impregnated with a suitable binder such as described in the above patent to Beckwith.

Figure 6:
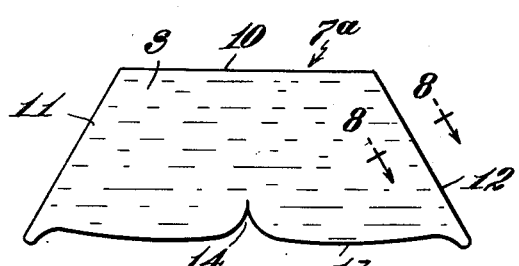
Fig. 6 is a plan view of a laminate quarter lining and stiffener blank in accordance with the present invention viewed from the side at which the stiffener material is exposed.
Figure 9:
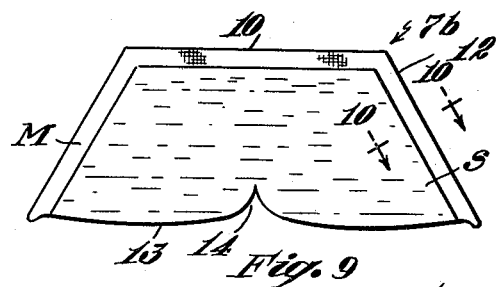
Fig. 9 is a plan view showing the combined counter lining and stiffener of Fig. 6, but after the top and lateral margins have been reduced in thickness.
Figure 8:
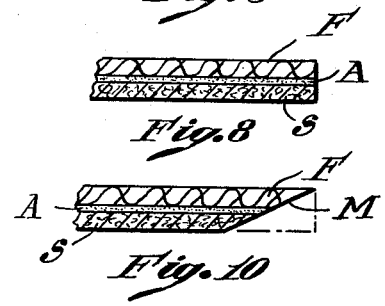
Fig. 8 is a fragmentary section, to larger scale, substantially on the line 8—8 of Fig. 6.
Figure 10:
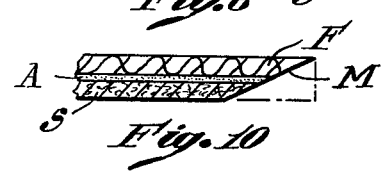
Fig. 10 is a fragmentary section, to larger scale, on the line 10—10 of Fig. 9.

Having prepared the laminate sheet 9, blanks 7ª (Fig. 4) may be cut from this sheet, for example, by the use of dies in a dinking or clicking machine. Desirably, the blanks are cut in such a way as to economize the material to the optimum extent. As shown in Fig. 6, one of the blanks 7ª thus cut from the sheet material is more or less trapezoidal in shape having the upper edge 10, the sloping lateral edges 11 and 12 and the lower edge 13, the latter preferably having a notch 14 at its midpoint. While this particular shape of blank is desirable it is to be understood that the blank may be of any desired contour in accordance with the style of shoe to be made and the extent to which the stiffener is to cover the inner surface of the quarter. The edges of this blank as cut from the sheet 9 will be substantially square edges (Fig. 8) of the full thickness of the sheet material. Having prepared such a blank, its margins, or at least some of its margins, are thinned down, usually by a skiving operation so that the edges are beveled as shown at M (Fig. 10). The skiving operation removes all of the stiffener material for a distance inwardly from the extreme edge of the blank and usually removes a portion of the liner fabric F so that the thinned edged portion of the liner fabric becomes very flexible and readily penetrable by a sewing needle. As illustrated in Fig. 9, only those margins along the edges 10, 11 and 12 are thus skived to make them flexible. The blank 7ᵇ (Fig. 9) having its top and side edges thus prepared will be useful when, in the moulding operation, the blank is to be provided with an attaching flange along its lower edge 13, it being desirable that such a flange be of the full thickness of the material. On the other hand if the blank, as shown at 7ᶜ (Fig. 11) is to be used in a shoe where a bottom flange is not desired (for instance in a California type shoe) then the margin along the lower edge 13 will be thinned down to make it penetrable by a sewing needle in securing the lower margin to a sock lining and wrapper strip.

Figure 2:
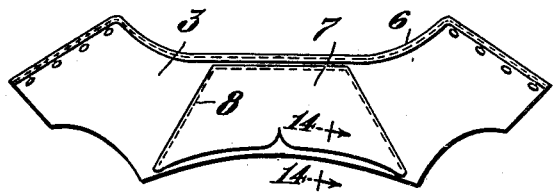
Fig. 2 is an inside view of the quarter of a shoe such as that shown in Fig. 1, having a quarter lining and stiffener according to the present invention, but before assembly with other parts of the shoe upper.
Figure 11:
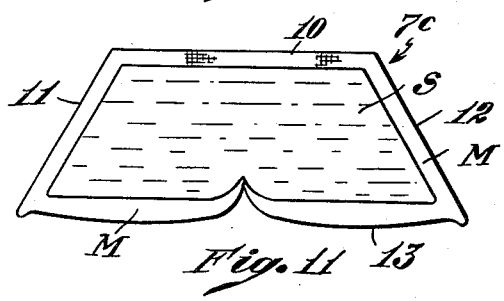
Fig. 11 is a view similar to Fig. 9, but showing the blank as having all of its margins reduced in thickness.
Figure 14:
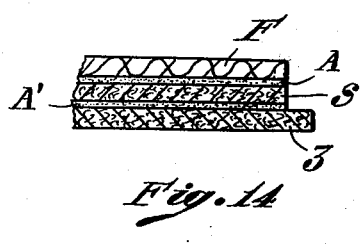
Fig. 14 is a fragmentary section, to larger scale, on the line 14—14 of Fig. 2.

After the blank has been reduced to the form shown in either of Figs. 9 or 11 it is assembled with the outer ply of the quarter, with the stiffener ply or layer S in contact with the inner surface of the outer ply of quarter material. It may be desired to coat the exposed surface of the stiffener ply S with adhesive, as shown at A" (Fig. 14) before assembling it with the outer ply of the quarter. In any event the combined stiffener and liner member is secured permanently to the quarter by the seams 8 (Fig. 2), whose stitches pass through the thinned margin M of the lining ply F and through the outer ply of the quarter, usually without passing through the stiffener ply S.

In the operation of combining the stiffener and quarter it is only necessary to handle two pieces, because the liner and stiffener form a single unitary structure, and this unit is readily associated with the quarter in the proper position and stitched to the quarter with the same facility and employing the same procedure as in stitching the usual unstiffened counter-liner element to the quarter portion of a shoe upper. Thus no difficulty is experienced in placing the stiffener in the exact desired position or in holding it in this position during the lasting operation.

Figure 12:
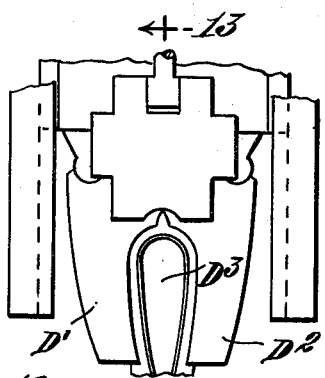
Fig. 12 is a diagrammatic front view showing the step of moulding the quarter portion of the upper in accordance with the present invention.
Figure 13:
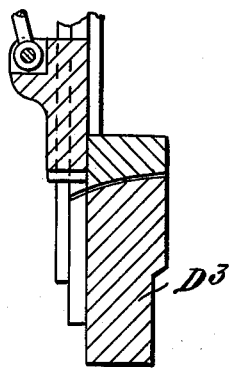
Fig. 13 is a vertical, central section, substantially on the line 13—13 of Fig. 12, but omitting the material of the shoe upper.
Figure 15:
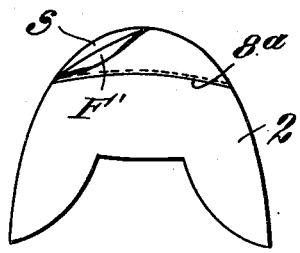
Fig. 15 is an inside elevation of the vamp portion of a shoe upper having a combined tip lining and stiffener in accordance with the present invention.

After the outer ply of the quarter and the composite liner have thus been permanently united, the quarter may be assembled with and stitched to the vamp, if desired, and then subjected to the moulding operation, or the quarter may first be moulded before it is united to the vamp. This moulding of the assembled quarter and quarter lining may be carried out by the use of the usual machine and dies employed for moulding counters. Thus in Figs. 12 and 13, the outer dies of such a machine are indicated at $D^1$ and $D^2$ and the inner die at $D^3$. Preparatory to moulding the stiffened portion of the quarter, it may be mulled or otherwise treated to soften the stiffener material. If the stiffener is of the type that requires a solvent, the solvent will be applied at this time. If the stiffener is of thermoplastic material, preparatory softening may not be necessary since the dies of the moulding machine will be heated so as to soften the thermoplastic material while the moulding operation is taking place. Instead of thermoplastic material, a thermosetting material may be employed which is normally soft and amenable to moulding treatment but which will become shape-retaining when subjected to the action of the heated dies.

Whatever the material employed and whatever the treatment adopted, the result of the entire operation is to provide a shoe quarter moulded to the final shape which the heel end of the shoe upper is to have in the completed shoe and requiring no further shaping in lasting, and which has stiffening material properly positioned and capable of retaining the shape imparted to it during moulding during the wear of the shoe.

Figure 3:
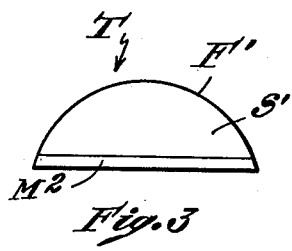
Fig. 3 is a plan view of a tip lining with associated stiffener which may be employed in accordance with the present invention.

While the operation has thus far been described with reference to the quarter portion of the shoe, it is obvious that the toe portion of the shoe may similarly be shaped and stiffened. Thus as illustrated in Fig. 3, a combined tip liner and stiffener T is illustrated comprising the stiffener ply $S^1$ and the liner ply $F^1$, these plies being united in the same way as the plies F and S above described, and having the margin $M^2$ skived to make it flexible. This tip stiffener will be associated with the vamp 2 in the same way that the quarter stiffener is associated with the quarter, as above described, and permanently secured to the vamp by stitches $8^a$ extending through the flexible margin $M^2$ of the tip stiffener.

While certain desirable steps and materials have herein been described by way of example it is to be understood that the invention is broadly inclusive of any and all modifications falling within the scope of the appended claim.

I claim:

That method of making a shoe quarter assembly for use in a shoe which has a closed shank portion and a stiffened counter portion, said method comprising as steps providing a flat composition counter-stiffener blank, said blank including a ply of relatively dense and hard stiffener material and a ply of relatively soft and flexible lining material adhesively bonded together, the upper and lateral margins of said blank being so beveled as to provide a feather edge portion consisting of the flexible ply only, providing a shoe quarter, associating the flat stiffener blank with said quarter so that the ply of stiffener material is opposed to the inner surface of the quarter and with adhesive interposed between them and with the vertical median line of the stiffener blank accurately registering with the vertical median line of the quarter, permanently uniting the stiffener blank to the quarter by a sewed seam which extends along the beveled margin of the stiffener blank and whose stitches pass through the quarter and the feather edge portion only of the stiffener blank, softening the stiffener material, moulding the assembled and united quarter and stiffener blank to provide a shaped and stiffened quarter assembly having side walls which integrally and smoothly merge with a rear wall and which, in vertical planes at least, have substantially the exact curved contour of the counter portion of the shoe to be made when the latter is fully completed.

WILLIAM F. HERLIHY.

References Cited in the file of this patent

UNITED STATES PATENTS

| Number | Name | Date |
|---|---|---|
| 503,614 | Packard | Aug. 22, 1893 |
| 1,640,362 | Mahler | Aug. 30, 1927 |
| 1,681,257 | Ricks | Aug. 21, 1928 |
| 2,217,274 | Hartwell | Oct. 8, 1940 |
| 2,344,458 | Calella | Mar. 14, 1944 |
| 2,360,951 | La Chapelle | Oct. 24, 1944 |